Nov. 8, 1966 S. L. PASTOR 3,284,580

RECORDING TAPE MECHANISM

Filed Nov. 6, 1962 6 Sheets-Sheet 1

INVENTOR.
SHELDON L. PASTOR
BY
Carpenter, Abbott, Coulter & Kinney
ATTYS.

RECORDING TAPE MECHANISM

Filed Nov. 6, 1962

INVENTOR.
SHELDON L. PASTOR
BY
Carpenter, Abbott, Coulter & Kinney
Att'ys.

Nov. 8, 1966 S. L. PASTOR 3,284,580

RECORDING TAPE MECHANISM

Filed Nov. 6, 1962 6 Sheets-Sheet 3

INVENTOR.
SHELDON L. PASTOR
BY
Carpenter, Abbott, Coulter & Kinney
ATTYS.

INVENTOR.
SHELDON L. PASTOR
BY
Carpenter, Abbott, Coulter & Kinney
Att'ys

Nov. 8, 1966 S. L. PASTOR 3,284,580

RECORDING TAPE MECHANISM

Filed Nov. 6, 1962 6 Sheets-Sheet 5

INVENTOR.
SHELDON L. PASTOR
BY
Carpenter, Abbott, Coulter & Kinney
Att'ys.

RECORDING TAPE MECHANISM

Filed Nov. 6, 1962

INVENTOR.

SHELDON L. PASTOR

BY

Carpenter, Abbott, Coulter & Kinney

Att'ys.

United States Patent Office 3,284,580
Patented Nov. 8, 1966

3,284,580

RECORDING TAPE MECHANISM

Sheldon Lee Pastor, Chicago, Ill., assignor to Minnesota Mining and Manufacturing Company, St. Paul, Minn., a corporation of Delaware Filed Nov. 6, 1962, Ser. No. 235,644
7 Claims. (Cl. 179—100.2)

This invention relates to improvements in mechanisms for handling magnetic recording tape and the like. The improvements particularly concern mechanisms for automatically threading recording tape from a supply reel onto a take-up reel and for controlling the movement of the tape in operative relationship with a play-record head.

Magnetic recording tape has for some years been generally considered superior to the phonograph record as a medium for audio reproduction. However, phonographs still dominate the household market because high quality tape recorders have not been convenient to use. Recently automatic cartridge-type tape recorders have appeared on the market but have met with buyer resistance due to inferior quality and reliability.

A newly developed cartridge-type tape recorder which may turn the public favor away from phonographs is disclosed and claimed in the copending application of Pastor et al., Serial No. 108,352, filed May 8, 1961, now Patent No. 3,149,797, and assigned to the assignee of the instant application. This recorder is adapted to employ a cartridge which contains a single reel carrying a length of recording tape to which is fastened a relatively stiff, normally straight leader. Rotation of the reel feeds the leader out of the cartridge along a predetermined path for automatic winding engagement with a take-up reel. After the leader is wound on the take-up reel, the tape is moved into contact with the play-record transducer head for audio recording or playback. At the end of the tape, automatic rewind is initiated, after which the cartridge is rejected and a cartridge stacked above it is automatically positioned and threaded for further recording or playback. Because the cartridge includes only one reel, it is compact and of simple, economical construction. It is more convenient to use and store than a phonograph record.

Any highly automated device is subject to malfunction, and the present invention is primarily directed toward improving the reliability of such tape recorders. For example, since a leader of the type employed in the cartridge of said Pastor et al. Patent No. 3,149,797 is not a recording medium, the record or playback operation should not be initiated until the leader has passed the transducer head. The present invention provides novel and reliable means for sensing the end of the leader and for then positioning the tape in contact with the transducer head.

Briefly, the novel leader feedout sensing means comprises a sensing member positioned adjacent the predetermined path along which the leader is fed to the take-up reel prior to transport of the leader from the supply reel. Biasing means urge the sensing member into contact with said leader when the leader is transported to the take-up reel. The biasing means are of such strength that the relatively stiff leader remains substantially along said predetermined path and the relatively limp recording tape moves out of said predetermined path to an alternate path to indicate the end of the leader. The recording tape when in said alternate path contacts the transducer head so the movement of the sensing member to the alternate tape path conveniently actuates the audio function of the recorder.

The present invention also provides improved means for maintaining the recording tape under even tension as it is drawn across the transducer head. Heretofore most household tape recorders have employed pressure pads in confronting relation to the heads. However, these can cause undue head wear, and the wear is often uneven due to misadjustment of the confronting pad. Also, frictional variations inherently associated with such devices prevent high fidelity. These devices are often complemented or replaced by braking mechanisms on the supply reel, but the inertial change as the tape is played off the supply reel prevents faithful audio reproduction. Professional-type recorders generally employ torque motors for back tensioning, but these are too expensive and heavy for normal household use.

Uniform tape tensioning is provided in the present invention by the seemingly simple expedient of employing between the supply reel and transducer head a pair of confronting pressure pads having resilient low-friction surfaces such as felt or similar fabric having resilient upstanding fibers. In an automated single-reel cartridge recorder of the type described, the movement of the sensing member to the alternate tape path actuates one or both of the pressure pads to bias them together to exert smooth, uniform back tension on the tape as it is wound upon the take-up reel.

When the tape is rewound into the cartridge, it is necessary to sense the completion of the rewinding so that the cartridge may be promptly rejected and the next stacked cartridge moved into the operative position. The leader employed in the cartridge of said Pastor et al. Patent No. 3,149,797 has a portion of greater width than the tape, and the present invention makes use of this width discontinuity for sensing the end of the leader upon rewind. This is accomplished by means of a pair of opposed sensing members located near the cartridge. When the tape is being rewound, the opposed surfaces of the sensing members are biased toward each other to define a boundary between the surfaces of less thickness than the leader. This boundary (which preferably is an area of broad contact between the surfaces) registers with the path of the tape on rewind but lies beyond the width of the tape and within the width of the leader to afford frictional contact between the leader and these opposed surfaces. This frictional engagement moves the sensing members as a unit to a second position to indicate the presence of the leader. The movement of the sensing members to said second position releases a leader feeling member (preferably the leader feedout sensing member discussed hereinabove since this is already associated with switching devices for controlling automated functions of the recorder) which is biased transversely of the tape path into contact with the tape. Again, the biasing means are of such strength that the leader remains substantially along said path and the leader feeling member moves transversely beyond said path to indicate the end of the leader.

Other advantages of the invention will become apparent as the description proceeds, reference being had to the drawings accompanying and forming a part of this specification, wherein.

Figure 1:
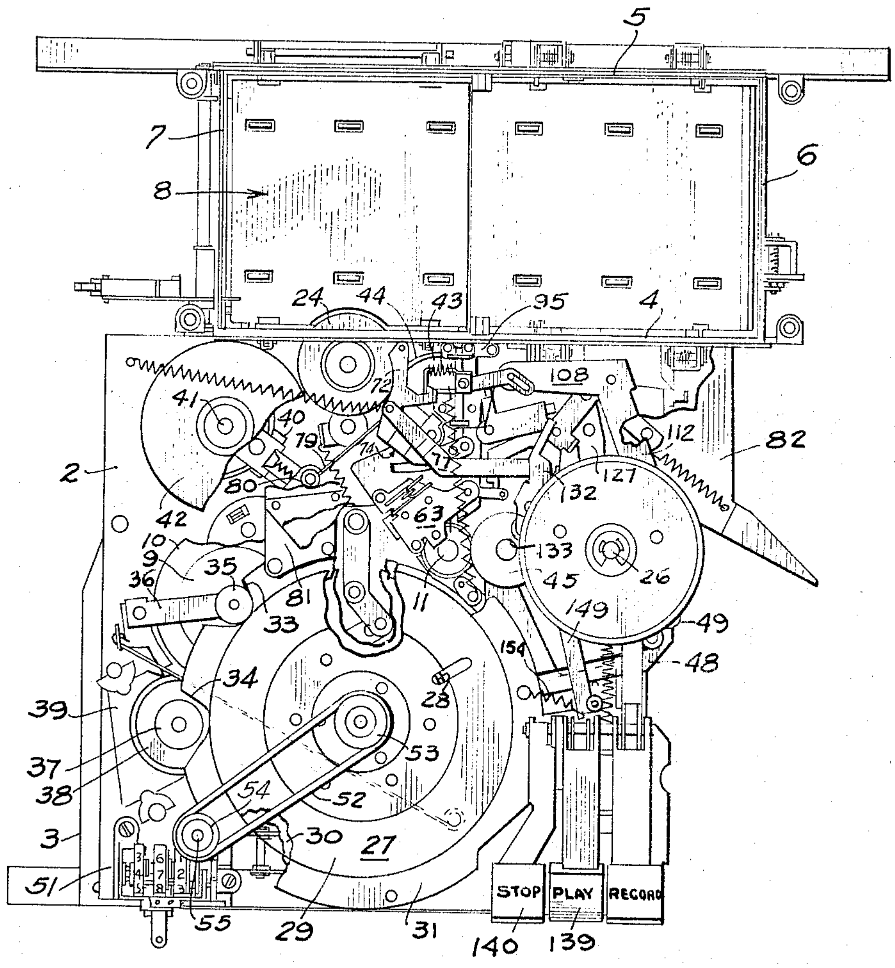
FIGURE 1 is a plan view of an automated cartridge-type magnetic tape recorder with the cover and certain other elements removed for purposes of clarity.

Referring more particularly to FIGURE 1 of the drawing, it will be observed that the improved recorder-reproducer comprises a generally rectangular-shaped chassis on which the component parts of the invention are mounted. The chassis comprises an upper deck 2 and a lower deck 3 spaced vertically therefrom. The chassis includes at the rear thereof spaced parallel vertical plate or wall members 4 and 5 joined by spaced parallel vertical wall members 6 and 7 to provide a rectangular well forming part of a cartridge storage and changer mechanism indicated generally by the numeral 8. The improved recorder-reproducer also includes an amplifier and a pair of speakers, neither of which are shown or described and which may be of any suitable construction.

Power for operation of the mechanism of the improved recorder-reproducer is derived from an electrical motor (not shown) mounted on lower deck 3 which has an upstanding drive shaft carrying at its upper end coaxially therewith a drive wheel 9, preferably having a rubber-like peripheral ring 10. Mounted in suitable bearings in the decks 2 and 3 is a capstan shaft 11 which projects above the deck 2 and has a fly wheel (not shown) fixed thereon between said decks which is driven by a suitably mounted idler drive wheel engageable between the motor drive shaft and the fly wheel to afford clockwise rotation of said fly wheel and the capstan shaft 11.

Figure 2:
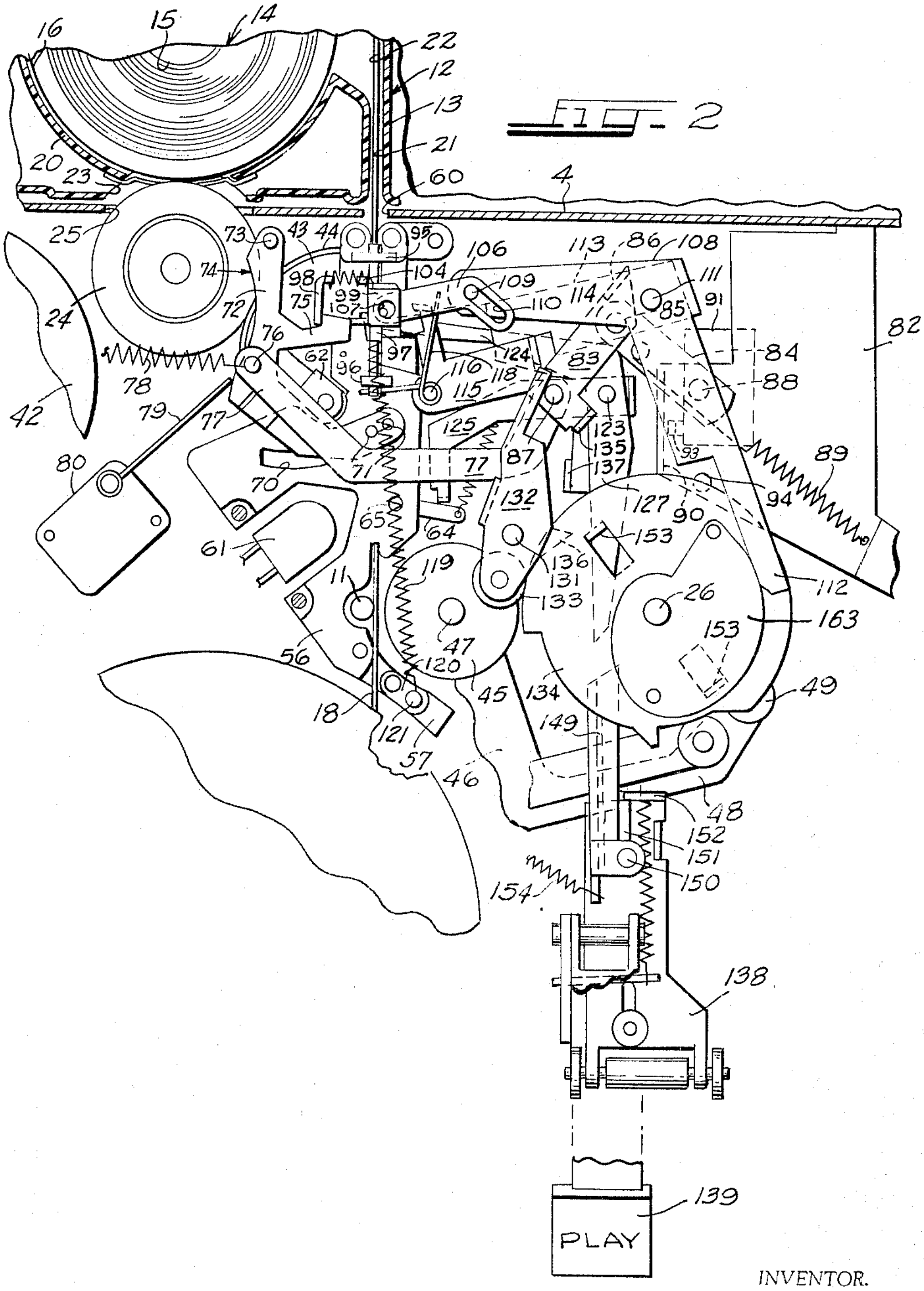
FIGURE 2 is a fragmentary plan view of elements of the recorder associated with the automatic feeding of recording tape from the supply reel to the take-up reel, the parts being shown in the position assumed during threading of the leader and tape.
Figures 3, 4:
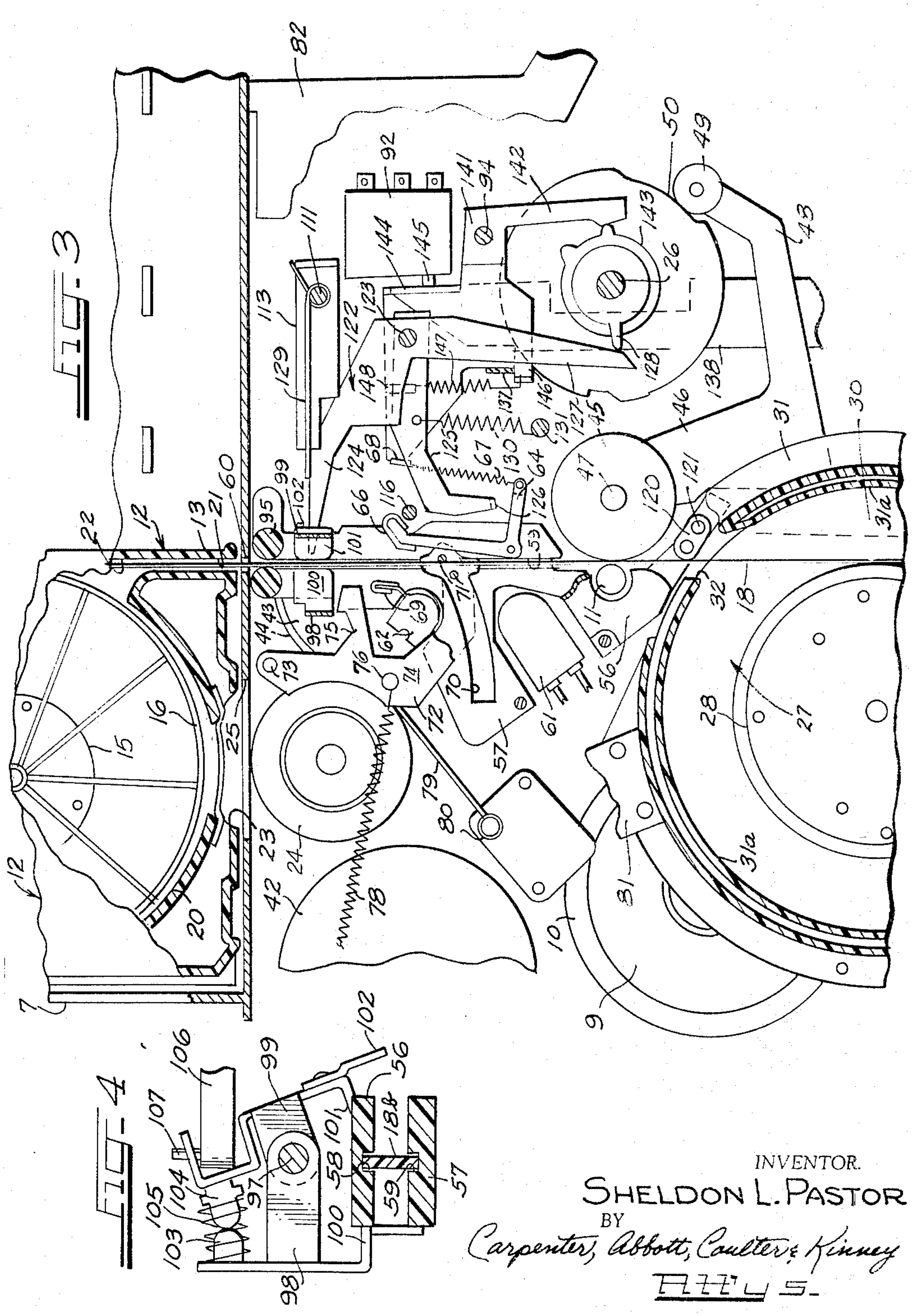
FIGURE 3 is a fragmentary sectional view similar to FIGURE 2 showing the "leader feedout sensing" position.
FIGURE 4 is a fragmentary vertical sectional view taken substantially along the line 4—4 of FIGURE 8.

The changer mechanism 8 is formed substantially in accordance with the mechanism shown and described in the copending application of Pastor et al., Serial No. 108,352 filed May 8, 1961, now Patent No. 3,149,797, and assigned to the assignee of the instant application. The changer mechanism is adapted to accommodate a stack of cartridges and position a single cartridge 12 in an operative position (FIGURES 2 and 3). The cartridge 12 comprises a shallow rectangular container 13, for example of plastic, within which a supply wheel 14 is journalled. In the illustrated embodiment, the supply reel 14 comprises a central hub portion 15 and spaced circular flanges 16.

Figures 6, 8, 10:
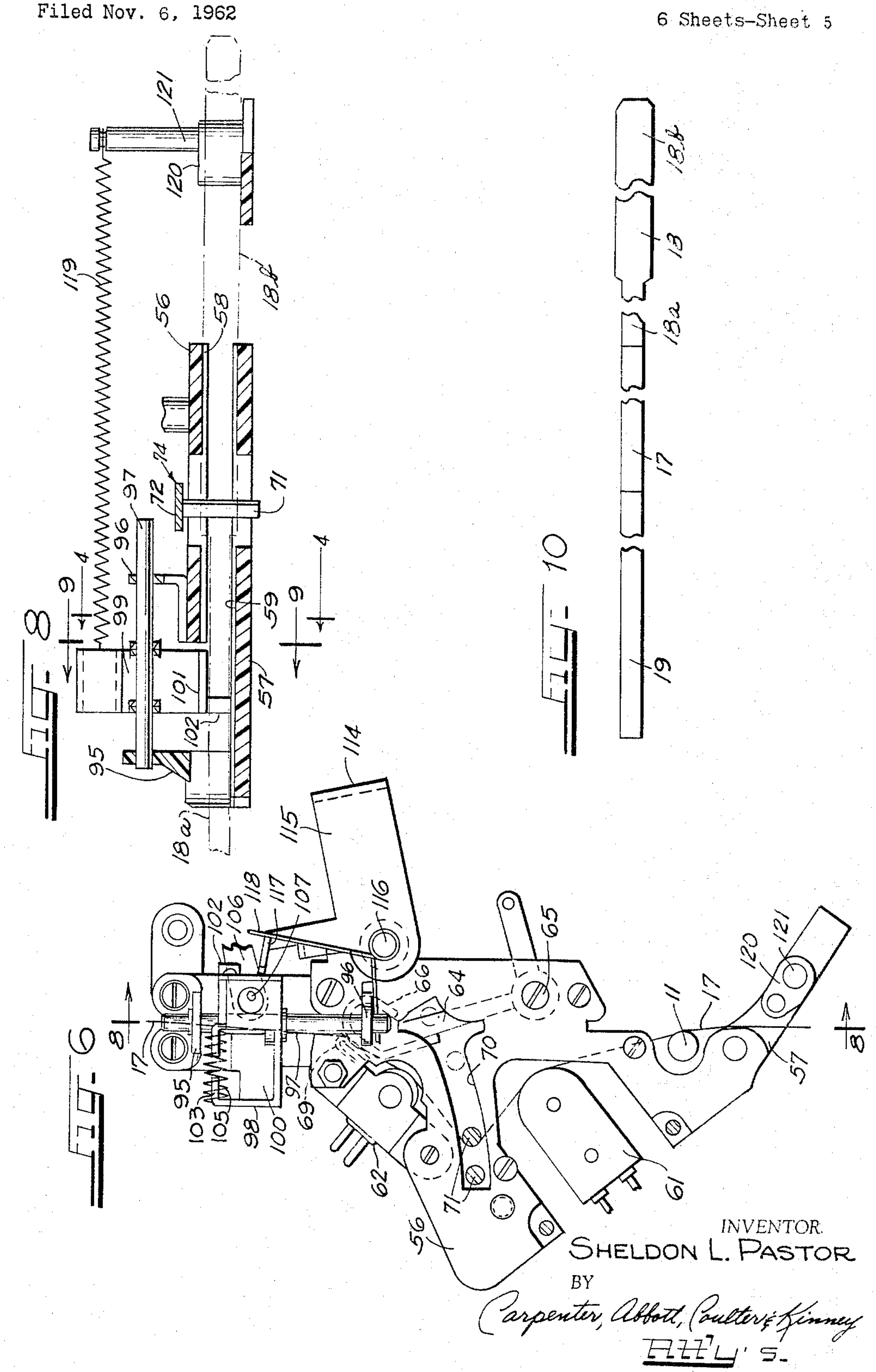
FIGURE 6 is a fragmentary plan view on an enlarged scale showing parts in "play" position.
FIGURE 8 is a fragmentary vertical sectional view taken along the line 8—8 of FIGURE 6.
FIGURE 10 is a fragmentary elevational view of an extent of magnetic tape showing a leader attached to one end and a trailer attached to the other end.

Referring to FIGURE 10, a magnetic recording tape 17 has a relatively stiff, flexible, normally straight leader 18 which may be biaxially-oriented polyethylene terephthalate film having a thickness of 10 mils (0.010 inch). The leader 18 has a short trailing end **18*a* of the same with as the tape (e.g. .150 inch) and a longer leading end portion 18*b* of a width (e.g., .238 inch) greater than the spacing between the reel flanges 16. A trailer 19 is attached to the other end of the tape 17 and has a width substantially the same as that of said tape. The trailer 19 is stiffer than the relatively limp tape 17 (the backing of which is preferably 0.5-mil biaxially-oriented polyethylene terephthalate film) but may be somewhat more flexible than the stiff, normally straight leader 18, e.g., 5-mil biaxially-oriented polyethylene terephthlate. The free end of the trailer 19 is fixedly attached to the hub 15 of the reel 14, and said trailer, together with the tape 17 and the portion 18*a* of the leader is wound on the hub 15 between the flanges 16. The portion 18*b* of the leader, due to its greater width, is wound on the peripheries of the flanges 16 when the cartridge 12** is not in use.

The container 13 of the cartridge 12 is formed with a cylindrical inner wall surface 20 of a diameter affording sufficient clearance for accommodation of the leader portion **18*b* wound on the flanges 16. An edge opening 21 is formed in the container 13 for passage therethrough of the leader 18, tape 17 and trailer 19, and a wall surface 22 extends from the opening 21 into tangency with the surface 20 as shown in FIGURE 2 to afford means for guiding the leader 18 to the opening 21 upon clockwise rotation of the reel 14 as will hereinafter appear. The container 13 is also formed with at least one edge opening 23 exposing the adjacent peripheral portions of the reel flanges 16 as well as the leader 18** wound thereon for a purpose to be described hereinafter.

As shown in FIGURES 1, 2 and 3, the chassis further supports a freely rotatable drive-out rewind roller 24 which is swingably mounted for movement through an opening 25 formed in the vertical wall member 4. The swinging movement of the drive-out-rewind roller 24 is provided in response to movement of a cam carried by a cam shaft 26 which is driven by suitable means in increments of 36° in the clockwise direction.

Additionally, the chassis supports a take-up reel 27, formed in accordance with the take-up reel illustrated in the patent to Pastor et al., No. 3,149,797 referred to hereinabove. The take-up reel 27 comprises a hub portion 28 and a pair of circular flanges 29 and 30. The upper flange 29 is fixed coaxially to the upper side of the hub 28. The lower flange 30 is axially movable with respect to the hub 28 but is interlocked therewith to be rotatably driven thereby. As shown in FIGURE 3, an arcuate, preferably circular, guide and deflecting member 31 is suitably mounted with its cylindrical inner surface **31*a* in spaced relation between the peripheral portions of the flanges 29 and 30 and coaxial therewith. The member 31 is formed with an opening 32 for passage therethrough of the leader and tape to be wound on the hub 28**.

The annular guide and deflecting member 31 is also formed with peripheral cutaway portions 33 and 34 (FIGURE 1). The cutaway portion 33 is formed adjacent a braking roller 35 mounted for frictional rotation on a swingably mounted arm 36. The cutaway portion 33 permits the roller 35 to be moved into and out of engagement with the peripheral edge of the flange 29. The cutaway portion 34 permits a drive spool 37 to be moved into engagement with the edge of the flange 29. The spool 37 is nonpositively driven by a wheel 38 mounted coaxially therewith on a shiftable plate member 39. When the plate member 39 is shifted into operative position with the spool 37 engaging the peripheral edge of the flange 29, the wheel 38 engages the drive wheel 9 which in turn drives the spool 37 counterclockwise and the take-up reel 27 clockwise providing a fast forward which is advantageous for searching.

Means is provided for alternately driving the drive-out-rewind roller 24 in either clockwise or counterclockwise direction. To this end, the upper deck 2 is slotted as at 40 (FIGURE 1) to slidably receive an upstanding stub shaft 41 having a rewind drive idler wheel 42 freely rotatable on the upper end thereof. The shaft 41 is slidable in the slot 40 to bring the wheel 42 into engagement with the drive wheel 9 and the drive-out-rewind roller 24 when the latter is disposed in an operative position through the opening 25 against the peripheral edges of the flanges 16 of the supply reel 14. The rewind drive idler wheel 42 serves to drive the roller 24 in the clockwise direction for rewinding the tape 17 upon the supply reel 14.

Means is also provided for driving the drive-out-rewind roller 24 in the counterclockwise direction to effect "threading" of the leader. To this end, a pulley 43, driven by a rubber-like belt 44 passing therearound and around a pulley on the capstan shaft 11, is moved to a position wherein the belt 44 engages the drive-out-rewind roller 24, rotating the same in a counterclockwise direction when in the operative position, engaging the leader 18 wound on the flanges of the supply reel 14.

A pressure roller 45 is swingably supported on an irregularly-shaped arm 46. The roller 45 is formed of rubber-like material and is freely rotatable on a stub shaft 47 carried by the arm 46. The arm 46 has a laterally projecting portion 48 carrying a cam follower 49 engageable with a cam 50 carried by the cam shaft 26, and is operative upon rotation of said cam shaft to move the pressure roller 45 into and out of tape driving engagement with the capstan 11.

The chassis also supports a counter 51 on the upper deck 2 which is driven by a suitable belt 52 passing around a pulley 53 carried by the spindle of the take-up reel 27 and a pulley 54 carried by a counter-shaft 55.

Figures 7, 9:
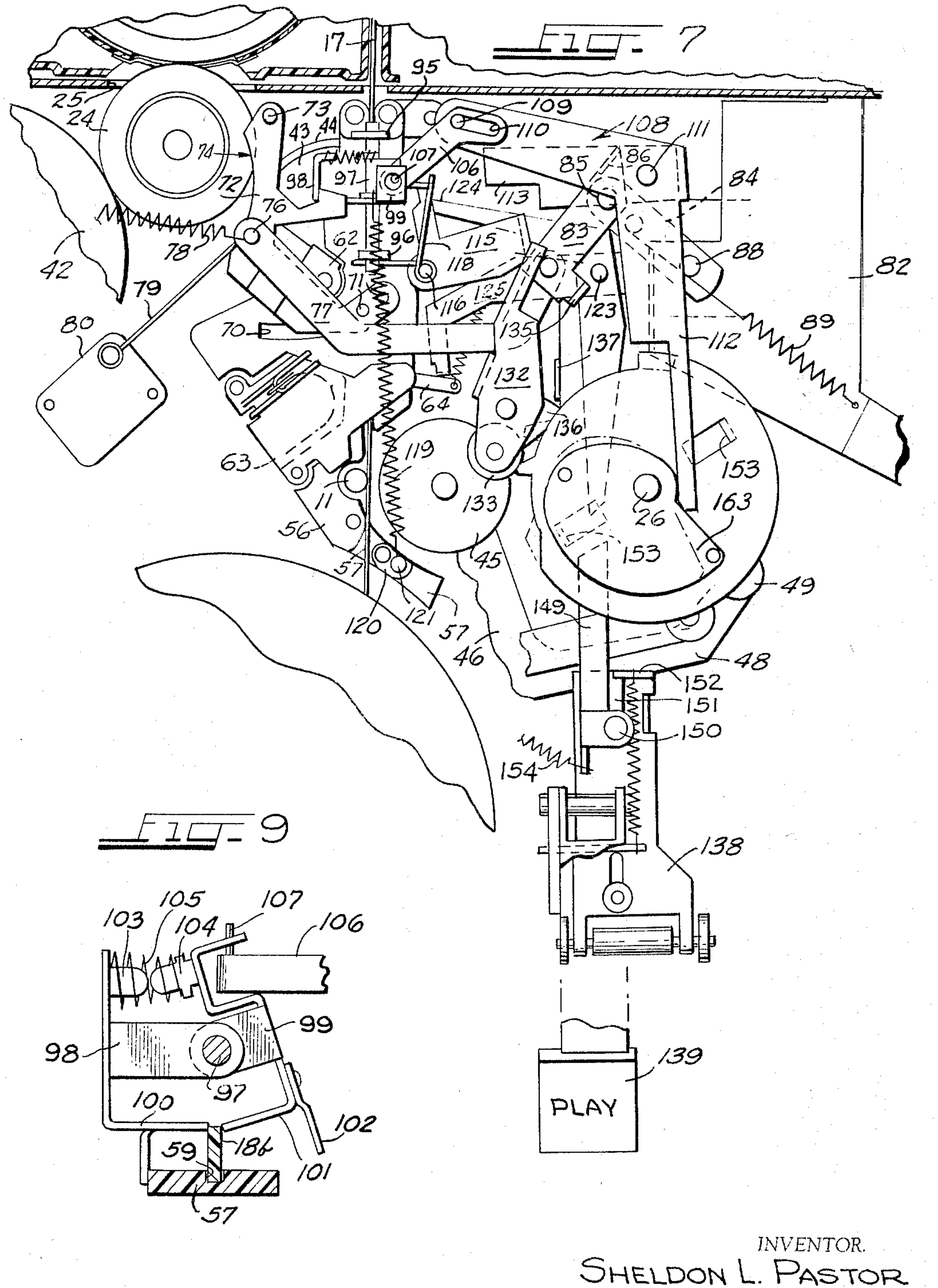
FIGURE 7 is a view similar to FIGURES 2, 3 and 5 showing initiation of the "rewind" position.
FIGURE 9 is a fragmentary vertical sectional view taken along the line 9—9 of FIGURE 8 showing the parts engaging the leader.

Referring now to FIGURES 3, 4, 6 and 8 of the drawing, there is shown in enlarged scale a pair of irregularly-shaped guide plates 56 and 57 which are vertically spaced a distance slightly greater than the width of the magnetic tape 17, the inner surfaces of said plates being disposed substantially coplanar with the inner surfaces of the flanges 29 and 30 forming the take-up reel 27. The plates 56 and 57 are formed with straight line rectangular grooves 58 and 59 which are of sufficient depth to accommodate the opposite edge portions of the leader 18 and are operable to afford a direct path for said leader from adjacent an opening 60 formed in the vertical wall 4 to the opening 32 formed in the annular guide and deflecting member 31 of the take-up reel 27. This predetermined path passes between the capstan 11 and the pressure roller 45 when the latter is retracted. Offset from this path is a magnetic play-record head 61 mounted, for example, by suspension from a plate 63 fixed on the upper plate 56 as shown in FIGURES 1 and 7. An erase head 62 is suitably supported in offset relation with respect to the path and, as shown in FIGURES 3 and 6, has a felt pad 69 fixedly mounted adjacent thereto. A pressure pad supporting member 64 is pivotally mounted intermediate its ends on a pin 65, said member carrying a resilient low friction pad 66 similar to pad 69. One end of a spring 67 connects the member 64 to a post 68 fixed on a slide bar 138 to be described in greater detail hereinafter. The spring 67 biases the member 64 counterclockwise toward a position so that when the magnetic recording tape 17 is in operative relation with the erase head 62 and play-record head 61, the pads 66 and 69 cooperate to provide uniform back tension on the tape, and also serve to clean the tape.

The upper and lower guide plates 56 and 57 are formed with registering arcuate slots 70 for accommodation of a pair of spaced vertical tape positioning pins 71 which depend from one end of an arm 72 and together with said arm provide a leader sensing, tape positioning member generally designated 74. The arm 72 is mounted for swinging movement on the axis of a vertical shaft 73 and is irregularly shaped, having a laterally projecting pawl 75. The arm 72 also carries a vertically extending pin 76 to which is pivotally connected one end of a generally U-shaped arm 77 and one end of a spring 78 which biases the arm 72 in the clockwise direction.

Referring now to FIGURE 2, the cartridge 12 is shown in the operating position and the major portion 18*b* of the leader is being driven off the flanges 16 of the supply reel 14 along the path formed by the grooves 58 and 59 toward the take-up reel 27. During this "threading" operation the pins 71 are positioned one on each side of the path and are retained in a fixed relationship with respect to said path. The pad supporting member 64 is held in its retracted position. The arm 46 supporting the pressure roller 45 holds said pressure roller out of engagement with the capstan 11 providing an unobstructed direct path for the leader from the supply reel 14 to the take-up reel 27.

Figure 5:
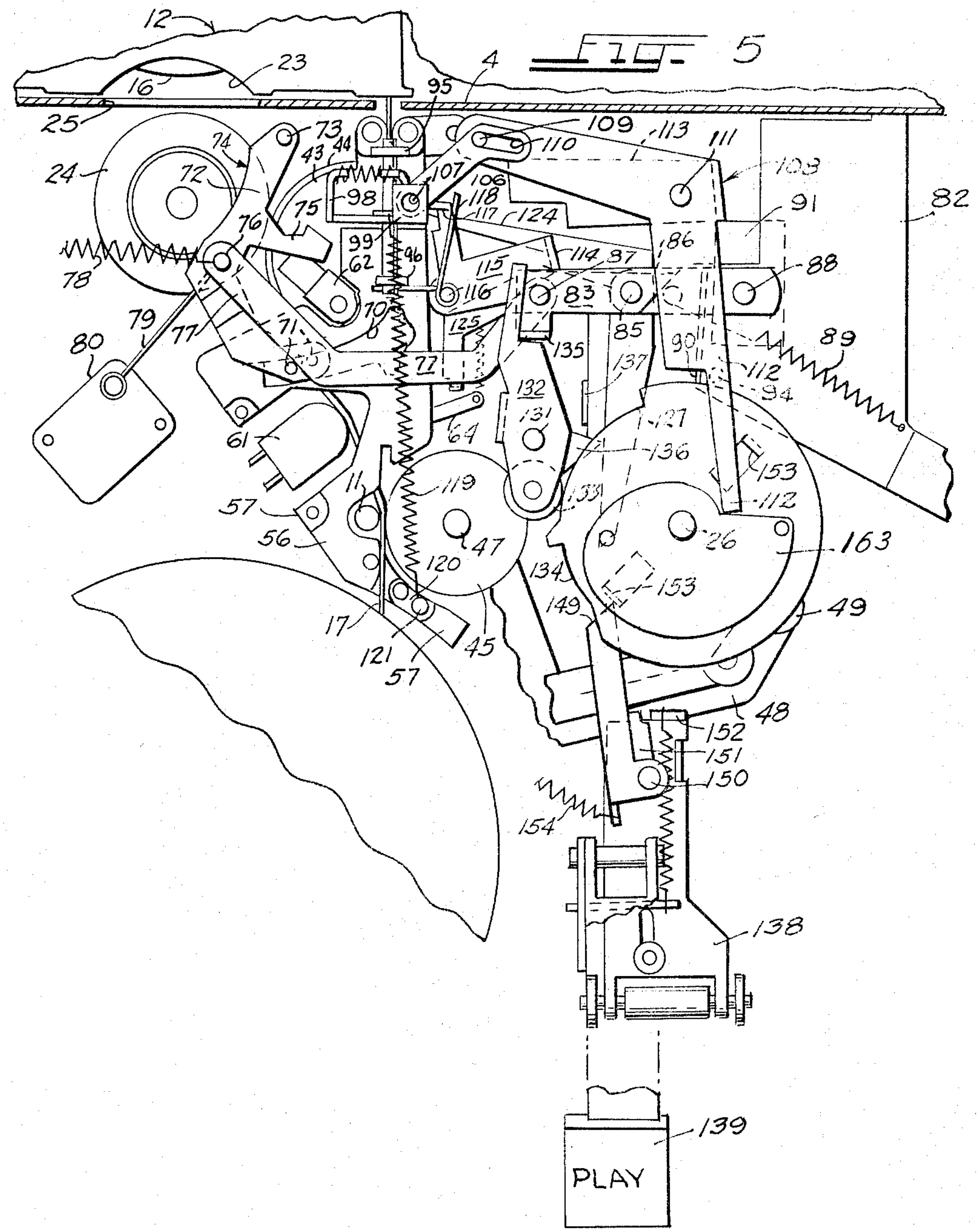
FIGURE 5 is a fragmentary plan view similar to that of FIGURE 2 showing the "play" position.

During the "sensing" operation as shown in FIGURE 3, one of the pins 71 moves transversely into engagement with one side of the leader 18 under the bias of the spring 78. This biasing force tends to draw the leader out of the path between the supply reel 14 and take-up reel 27. When the pin 71 engages the portion 18*b* of the leader, the grooves 58 and 59 prevent displacement of the leader and when engaging the portion 18*a*, the relative stiffness of the leader prevents substantial displacement of said leader. After the leader has been wound around the hub 28 of the take-up reel 27, under driving engagement with the capstan 11, the pin 71 engages the tape 17 and the spring 78 has sufficient strength to draw the limp tape into the alternate path around the erase head 62 and record head 61 as shown in FIGURES 5 and 6.

When the sensing member 74 is moved to the alternate position in the slot 70, the arm 72 of said member coacts with an arm 79 of a normally open switch 80 mounted, for example, on a plate 81 (FIGURES 1 and 3) fixed to the annular guide and deflecting member 31. Also, as the arm 72 draws the tape into the alternate path, the U-shaped arm 77 is moved from the position thereof shown in FIGURE 2 to the "play" position shown in FIGURE 5. The arm 77 together with a toggle linkage, which is formed by a link 83 and a link 84, provide a compression link between the arm 72 and a reject arm 82 when said arm 72 is moved to "play" position. The links 83 and 84 are pivotally connected to each other by a pin 85. Link 83 is connected by pin 87 to arm 77 and link 84 is connected to the reject arm 82 by a pin 88. The link 83 carries a depending flange 86 engageable with the link 84 in such a manner that the pin 85 can be carried to an over center position between the pins 87 and 88. A spring 89 connected to the link 84 and to the reject arm 82 biases the toggle linkage to the over center "locked" position.

Positioned beneath the reject arm 82 is a pair of superimposed switches, the upper one of which is identified by the reference numeral 91 (FIGURE 2) and the lowermost switch is identified by the numeral 92 (FIGURE 3). The normally open upper switch 91 has a plunger 93 which is actuated by engagement with a depending flange 90 on the reject arm 82 upon clockwise rotation of the reject arm 82, either by manual pivotal movement thereof or by the trailer 19 becoming taut at the end of the tape. As the trailer is drawn taut between the capstan 11 and supply reel 14, the increased pressure applied on the pin 71 shifts arm 77 and the toggle links 83 and 84 to rotate the reject arm 82 about its pivotal mounting on a pin 94. In either instance actuation of the plunger 93 to close the switch 92 energizes the apparatus to rotate cam shaft 26 to the "rewind" position.

The improved recorder-reproducer also includes sensing means operative during a rewind operation to sense the passage of the leader 18 into the cartridge 12. To this end, a pair of upstanding apertured bracket members 95 and 96 (FIGURES 2, 5, 6 and 8) are mounted adjacent the wall 4, and a horizontal shaft 97 extending parallel with the grooves 58 and 59 is axially slidable in said brackets. A pair of cooperating rewind sensing members 98 and 99 are pivotally mounted on the shaft 97 and have inturned lower jaw portions 100 and 101 (FIGURES 3, 4, 8 and 9) disposed in a plane corresponding to the groove 58 in the upper guide plate 56, said jaw portions terminating in rounded opposing inner edge surfaces shown most clearly in FIGURE 3. The member 99 has a depending finger 102 mounted on the side thereof depending to a position below the jaw 101.

The members 98 and 99 are formed on their upper ends with upstanding lugs formed with horizontally extending opposed projections 103 and 104. A helical compression spring 105 surrounds the projections 103 and 104, biasing said projections apart and bringing the jaws 100 and 101 into engagement with each other. The jaws 100 and 101 are positioned vertically above the path of the tape 17 as it is drawn through the machine (FIGURE 8) but are in a position to frictionally grasp the major portion 18*b* of the leader 18 as it is drawn toward the supply reel (FIGURE 9). It is necessary to provide means for opening the jaws 100 and 101, as shown in FIGURE 4, when the leader is being threaded from the supply reel 14 to the take-up reel 27. To this end, a link 106 carrying a pin 107 which loosely fits in an aperture formed in the upstanding lug on the sensing member 99 is slidably connected at its opposite end to an irregular-shaped arm 108 by means of a pin 109 fitting in a slot 110 formed in the end of said link 106 (FIGURE 2). The arm 108 is pivoted about an upstanding post 111 projecting upwardly from the deck 2. The arm 108 has a cam follower portion 112 engageable with a cam 163 fixed to the cam shaft 26 and rotation of said arm 108 affords opening of the jaws 100 and 101 against the bias of the spring 105. The arm 108 has a third portion 113 extending substantially normal to the cam follower portion and projecting toward the guide plates 56 and 57. The portion 113 of the arm 108 engages a depending flange 114 on a pivoting latch member 115 affording unlatching means for said member after the sensing members 98 and 99 have performed their sensing function. The latch member 115 is pivoted about a pin 116 and carries at one end thereof an upstanding flange 117 engageable with the sensing member 99. A torsion spring 118 acting against the upstanding bracket 96 and the flange 117 urges the latch member 115 to pivot counterclockwise such that the flange 117 engages the sensing member 99 to restrain the sensing member from being urged away from the wall 4 under the bias of a spring 119. This latch 115 thereby prevents reengagement of the pawl 75 with sensing member 98 after it is released therefrom under the influence of the leader 18 as it is rewound in the cartridge 12. The spring 119 is connected at one end to the upstanding lug on the sensing member 99 and is connected at the other end with a pin 121 extending upwardly from a guide post 120 fixed to the lower guide plate 57.

As shown most clearly in FIGURE 3, an irregular-shaped arm 122 pivotally mounted about a pin 123 has a projecting portion 124 engageable with the depending finger 102 mounted on the sensing member 99. A second projecting portion 125 of the arm 122 has a depending flange 126 engageable with a portion of the pressure pad member 64. A third projecting portion 127 of the arm 122 serves as a cam follower engaging the cam 128 fixed to the cam shaft 26. The cam 128 is provided with a single lobe for rotating the arm 122 in the clockwise direction to move the sensing members 98 and 99 toward the wall 4 to release the pawl 75 from the member 98 as the apparatus is shifted to the sensing position (FIGURE 3) after driving out the leader. The arm 122 simultaneously allows the pressure pad member 64 to be urged under the bias of the spring 67 in the counterclockwise direction toward pad 69. The arm 122 is urged counterclockwise against the cam 128 by a torsion spring 129 fixed about the post 111 and by a spring 130 connected at one end to the projecting portion 125 and fixed at its other end to a post 131.

When the latch member 115 is drawn out of engagement with the sensing member 99 by the portion 113 of the arm 108, the sensing members 98 and 99 are urged away from the wall 4. The forward position of the sensing member 98 brings the same into engagement with the pawl 75 carried on the arm 72. In this position, after the rearward movement of the sensing members 98 and 99 under the force of the portion 124 of arm 122, the sensing member 74 can sense the end of the leader 18 and draw the tape into "play" position past the play-record head 61.

As viewed in FIGURES 2, 5 and 7, a channel-shaped arm 132 is pivotally mounted on the post 131 and carries at one end thereof a cam follower roller 133. The cam follower roller is engageable with the cam 134 secured to the cam shaft 26. The arm 132 serves to break the toggle linkage formed by the links 83 and 84 when the cam follower roller 133 is following the large-radius portion of the cam 134. This action serves to draw the arm 72 counterclockwise moving the pins 71 from the alternate position in the slot 70 to their original position adjacent opposite sides of the path formed by the grooves 58 and 59. To accomplish the folding of the toggle linkage the arm 132 engages an upstanding flange 135 formed on the link 83 to move said link counterclockwise moving the pin 85 from its over center position, and then upon further clockwise rotation the lever 132 engages the pin 87 to draw the arm 77 and arm 72 across the guide plates from the position shown in FIGURE 5 to the position shown in FIGURE 7. A projection 136 is formed on the lower portion of the arm 132 and is engageable with an upstanding bracket member 137 (FIGURES 2 and 3) formed on the slide bar 138 mentioned hereinabove. The bracket 137 on the slide bar 138 also effects clockwise movement of the lever 132 to shift the arm 72 from its alternate position to its original position and such movement does not actuate the plunger 93 of switch 91.

Movement of the slide bar 138 is effected by a play key 139 (FIGURES 1, 2, 5 and 7) mounted for vertically swinging movement on the chassis. Depression of the play key 139 shifts the slide bar 138 toward the wall 4 and holds said bar in this position permitting the cam follower roller 133 of the lever 132 to follow the cam 134. A stop key 140 is mounted for vertical swinging movement on the chassis, and depression of this key releases the play key 139 allowing the slide bar 138 to move in a direction away from the wall 4. This return movement of the slide bar 138 will occur only when the machine is not performing an automatic function, e.g., the bar will not move away from the wall except when the machine is in the "play" position or when the changer mechanism 8 is ready to accept the next cartridge.

Referring again to FIGURE 3, the lower switch 92 positioned beneath the reject arm 82 and switch 91 is a single pole double throw switch and is shown in its operative relation with respect to an irregular-shaped arm 141. The arm 141 has a cam follower portion 142 thereof engageable with a cam 143 and has a flange 144 positioned for engagement with a plunger 145 operating the switch 92. The switch 92 is connected with the switch 80 and switch 91 in circuit relation to alternately direct current thereto under the control of cam 143. When the cam 143 moves the plunger 145 inward the switch 92 directs the circuit to switch 80 and when said plunger is released the switch directs the circuit to switch 91. Arm 141 also has a projecting portion 146 with an upturned end portion which is engageable with the slide bar bracket member 137 when the slide bar 138 is moved away from the wall 4 upon depression of the stop key 140. This movement releases the plunger 145, connecting the circuit from switch 92 to switch 91, while the cam shaft 26 is in "play" position. The upturned portion of the projection 146 is connected by a spring 147 to an upstanding ear 148 carried by the slide bar 138 to bias the arm 141 clockwise effecting engagement thereof with the cam 143.

Means is also provided for preventing the interruption of the automatic "threading" or automatic "rewind" operation. To this end a lock arm 149, pivoted on a vertical post 150 which is fixed to the upper deck 2, carries a locking tab 151 engageable with an upstanding bracket 152 fixed relative to the slide bar 138. The arm 149 engages depending tabs 153 carried by the cam 134 and engagement therewith shifts said arm and tab 151 out of engagement with the bracket 152 when the cam shaft 26 is in the "play" position (FIGURE 5) and when the changer mechanism 8 is ready to accept the next cartridge. The tab 151 is biased by a spring 154 into locking engagement with bracket 152 to prevent the slide bar from moving rearwardly when the leader is being fed to the take-up reel 27 (FIGURE 2) and when the tape and leader are being rewound on the supply reel (FIGURE 7).

*Operation*

At the beginning of a cycle with the present recorder-reproducer apparatus, when the play key 139 is depressed moving the slide bar 138 toward the wall 4 and a cartridge 12 is in operative position in the changer mechanism 8, the drive-out-rewind roller 24 is moved through the opening 25 into engagement with the leader wound on the reel flanges 16 (FIGURE 2). The belt 44 is moved into engagement with the roller 24 to rotate the supply reel 14 in the clockwise direction. This rotation drives the straight leader 18 through the cartridge opening 21 and through the aligned opening 60 in the wall 4 into the path formed by grooves 58 and 59. As the leader is driven along the path it is directed between the flanges 29 and 30 of the take-up reel 27.

After the cam shaft 26 has rotated in 3 increments of 36°, the drive-out-rewind roller 24 is withdrawn during the next increment of rotation to the position thereof shown in FIGURE 3. Also, during this increment of rotation of the cam shaft 26, the sensing members 98 and 99 are moved rearwardly by the clockwise rotation of the lever 122 to release the pawl 75. Simultaneously, the cam follower roller 133 moves off the outermost peripheral edge of the cam 134 permitting the lever 132 to rotate in the counterclockwise direction. This allows the lever arm 72 to pivot clockwise under the bias of spring 78 bringing a pin 71 of the sensing member 74 into engagement with the tape or a portion of the leader disposed along the path formed by the grooves 58 and 59. At the same time, the lever 46 is rotated counterclockwise bringing the pressure roller 45 into driving engagement with the capstan 11. The arm 141 (FIGURE 3) is cammed counterclockwise releasing the plunger 145 on the switch 92 moving the contact thereof to its alternate position directing the circuit to the switch 80. Normally the leader will have been completely wound on the take-up reel 27, but in the event that the leader has advanced only as far as the capstan 11 the pressure roller 45 engages the leader to drive it into the take-up reel 27.

If the wide portion **18*b* of the leader is still within the grooves 58 and 59 when the pin 71 moves into engagement therewith, sensing member 74 is blocked from further movement. Then as the wide portion 18*b* leaves the grooves 58 and 59, the sensing member 74 rides against the narrow trailing portion 18*a*, but the leader remains substantially within the original direct path between the reels due to the stiffness of the leader. However, the spring 78 is of such strength that when the sensing member 74 contacts the relatively limp tape 17 the sensing member moves the tape out of said direct path to its alternate path as shown in solid lines in FIGURE 6. As the sensing member 74 moves the tape to its alternate position, the pressure pad 66 moves into tape gripping relation with pad 69 to provide uniform back tension which holds the tape 17 against the erase head 62 and the play-record head 61**.

As the sensing member 74 swings to the alternate position bringing the pins to the left along the slots 70, the toggle linkage formed by links 83 and 84 is straightened forming a rigid link with arm 77 connecting arm 72 with the reject arm 82 and the arm 72 strikes the arm 79 of the switch 80 closing the contacts thereof to energize the apparatus causing the cam shaft 26 to rotate another 36 to the "play" position (FIGURE 5). This rotation of cam shaft 26 moves the cam follower 112 of the lever 108 from the radially outermost portion of the cam 163 permitting the arm 108 to pivot in the clockwise direction. This movement allows the link 106 to pivot about the pin 109 whereupon the spring 105 biases the sensing members 98 and 99 to a position wherein the jaws 100 and 101 thereof abut each other in a position just vertically above the tape 17 and moves said sensing members to a position adjacent the upper guide plate 56. The rotation of cam shaft 26 to "play" position also enables the amplifier and speakers to begin a playback or record function on the tape 17, and the arm 141 is cammed clockwise to its normal position depressing plunger 145 on switch 92 directing the electrical circuit to the switch 91. Further, the counter 51 is enabled to begin counting the take-up reel rotations. At this point the mechanism is in the "play" position and the tape 17 will be continuously driven by the capstan 11 and pressure roller 45 past the play-record head 61 and wound upon the take-up reel 27.

If it is desired to stop the feeding of the tape when the mechanism is in this position the stop key 140 may be depressed allowing the slide bar 138 to move away from the wall 4. This action imparts clockwise rotation to the lever 132 by the engagement of the bracket member 137 with the projecting portion 136 of said lever 132. The clockwise rotation of the lever 132 first causes the toggle links 83 and 84 to fold and continued rotation of the lever 132 moves the pin 87 and lever arm 77 to the right, drawing the arm 72 out of its alternate position to its position adjacent the path formed by the grooves 58 and 59. The arm 141 is rotated counterclockwise and the plunger 145 on switch 92 is released to disable the reject switch 91. As the arm 72 is swung in the counterclockwise direction the pressure pad member 64 is retracted from the tape 17 and said tape is drawn away from the heads 61 and 62. Upon the subsequent depression of the play key 139 the parts return to their "play" position.

After the full extent of tape is played, the trailer 19 is unwound and drawn through to the capstan 11. When the trailer 19 becomes taut between the capstan 11 and the supply reel 14 to which it is attached, the arm 72 is forced in the counterclockwise direction. This rotation of the arm 72, under the tension of the trailer 19 moves the arm 77 and locked toggle links 83 and 84 to the left causing clockwise rotation of the reject arm 82 such that the flange 90 thereof depresses the plunger 93 to close the switch 91. Closure of the contacts in the switch 91 energizes the apparatus causing the cam shaft 26 and associated cams to be rotated to the position shown in solid lines in FIGURE 7. The rotation of cam 128 moves arm 122 counterclockwise allowing the sensing members 98 and 99 to move away from the wall 4. Cam 134 pivots the lever 132 such that the toggle links 83 and 84 are folded and the arm 77 is positively moved to the right as viewed in FIGURE 7 moving the arm 72 to its original position with the pins 71 adjacent the path formed by the grooves 58 and 59 and bringing the pawl 75 into locking engagement with the sensing member 98. The rotation of the cam shaft 26 also brings the pressure roller 45 away from the capstan 11 as viewed in FIGURE 7 and the arm 141 is rotated counterclockwise releasing plunger 145 to direct the circuit to the switch 80.

When the cam shaft 26 has completed its 36° increment of rotation it assumes the position indicated by the dot and dash lines of the lobe of the cam 134 in FIGURE 7. This resets the tape-travel counter 51, mutes the speakers and moves the drive-out-rewind roller 24 through the opening 25 in the wall 4 into engagement with the flanges 16 of the supply reel 14. Simultaneously, the rewind drive idler wheel 42 is moved into engagement with the drive-out-rewind roller 24 and the drive wheel 9 to effect clockwise rotation of the roller 24 and counterclockwise rotation of the supply reel 14. This positioning of the drive rolls begins the rewinding of the tape 17 on the supply reel 14.

As the leader 18 is drawn through the grooves 58 and 59 during "rewind" as shown in FIGURE 8 the presence of the major portion **18*b* of said leader is sensed by frictional engagement with the closed jaws 100 and 101 (FIGURE 9) of the sensing members 98 and 99** positioned directly above the tape, moving said sensing members as a unit toward the wall 4. This releases the pawl 75 from the sensing member 98 and since the lobe on cam 134 is moved out of engagement with the follower 133 of arm 132, the spring 78 tends to pivot the sensing member 74, arm 77 and arm 132 in the clockwise direction, drawing one of the pins 71 into engagement with the leader portion 18*b*. Then as the free end of the leader passes the pin 71, the spring 78 biases the sensing member 74 clockwise beyond the path taken by the tape and leader to actuate the switch 80 to energize the apparatus causing the cam shaft to rotate another 36°. This disables the rewinding and initiates operation of the changer mechanism 8.

Should it be desired to reject a cartridge which is being played, the operator may at any time manually move the reject arm 82 clockwise to actuate the plunger 93 on switch 91. This action also energizes the apparatus causing the cam shaft 26 to be rotated shifting the several parts to the "rewind" position as described above.

What is claimed is:

1. For use with a supply reel wound with magnetic recording tape having a relatively stiff leader attached to the outer end of the tape,
  a magnetic tape recorder including
    means for rotatably mounting said supply reel,
    a rotatably driven take-up reel,
    means for automatically feeding a said leader from the supply reel along a predetermined direct path to the take-up reel and for effecting winding engagement of the leader on the take-up reel,
    a magnetic transducer head positioned in spaced relationship from said direct path,
    a capstan and cooperating pressure roller positioned on opposite sides of said direct path between the head and the take-up reel, and
    a tape-travel counter,
  said tape recorder having in combination:
    a pair of pads each having a resilient low-friction surface positioned on opposite sides of said direct path between the magnetic head and the supply reel,
    a sensing member positioned between said pads and said pressure roller-capstan and adjacent said direct path prior to transport of a said stiff leader from the supply reel,
    biasing means urging said sensing member against said leader and tape and toward said magnetic head when the leader is transported to the take-up reel along said direct path,
      said biasing means being of insufficient strength to overcome the stiffness of the leader across the spacing between said pads and said pressure roller-capstan so that the leader remains substantially within said direct path and being of sufficient strength to move a relatively limp magnetic recording tape to an indirect path and into confronting relation to said magnetic head to indicate the end of the leader, and
    means controlled by said movement of the sensing member for (1) biasing one of said pads transversely of said indirect path toward the other pad to press the tape between the pad surfaces and thereby afford uniform tape tension, (2) actuating said counter, and (3) actuating the magnetic head.

2. For use with a supply reel wound with a limp tape having a relatively strong trailer attached to the inner end of the tape and fixed to said supply reel and having a relatively stiff straight leader attached to the outer end of the tape, said leader having a portion of greater width than said tape,
  tape transport mechanism including
    means for mounting and rotatably driving a said supply reel, a rotatably driven take-up reel,
    means for automatically feeding a said leader from the supply reel along a predetermined direct path to the take-up reel and for effecting wind-up engagement of the leader on the take-up reel,
    a pair of means positioned along one side of said direct path and spaced from each other lengthwise of the path,
    means for defining a predetermined indirect path to said one side of the direct path between said pair of spaced means, to which indirect path the trailing end of the leader is free to be moved while the leading end of the leader is being wound on the take-up reel,
    means for automatically rewinding the tape along said predetermined direct path,
  said transport mechanism having in combination:
    a sensing member positioned between said pair of spaced means on the opposite side of said direct path prior to transport of a said stiff leader from the supply reel,
    biasing means urging said sensing member into contact with said leader and tape and toward said indirect path when the leader is transported to the take-up reel,
      said biasing means being of insufficient strength to overcome the stiffness of the leader across said pair of spaced means so that the trailing end of the leader remains substantially within said direct path and being of sufficient strength to move the relatively limp tape to said indirect path to indicate the end of the leader and the beginning of the tape,
    means locking said sensing member at said indirect path,
    means for releasing said locking means actuated by the trailer becoming taut at the end of the tape to return the sensing member to its original position,
    means actuated by said return of said sensing means to lock said sensing member in its original position and for energizing rewinding,
    a pair of rewind sensing members having opposed surfaces,
    means actuated by said return of said sensing member for biasing said surfaces into contact,
    means locating said opposed surfaces in a first position near said supply reel wherein the boundary between the opposed surfaces registers with said predetermined path but lies completely beyond the width of the major portion of the tape and within the width of said wide leader portion,
    means permitting said rewind sensing members to move as a unit along said predetermined path to a second position upon frictional engagement with said leader,
    means controlled by the movement of said rewind sensing members to said second position for enabling the first named biasing means to urge said first named sensing member into contact with said leader and toward said indirect path, and
    means actuated by movement of said first named sensing member toward said indirect path after the leader passes to disable the means for energizing rewinding.

3. In a transducing machine having means for rotatably mounting a supply reel wound with recording tape,
  means for mounting and rotatably driving a take-up reel,
  means defining a predetermined path between said reels as the tape is wound upon a said take-up reel, a capstan and cooperating pressure roller positioned on opposite sides of said predetermined path,
means for effecting driving engagement between the capstan and pressure roller, and
a transducer head positioned adjacent said path between the pressure roller-capstan and a said supply reel, the improvement comprising:
a pair of pads each having a resilient low-friction surface positioned on opposite sides of said path between the transducer head and the supply reel, and
means biasing at least one of said pads transversely of said path toward the other to press the tape between said surfaces and thereby afford uniform back tension in the tape as it is drawn across the transducer head by the driving engagement of the pressure roller and capstan.

4. In a magnetic tape recorder having means for rotatably mounting a supply reel wound with recording tape,
a rotatably driven take-up reel,
means defining a predetermined path between said reels as the tape is wound upon said take-up reel,
a capstan and cooperating pressure roller positioned on opposite sides of said predetermined path,
means for effecting driving engagement between the capstan and pressure roller,
a magnetic transducer head positioned adjacent said path between the pressure roller-capstan and the supply reel, and
a member movable transversely of the path for drawing the tape into engagement with said heads, the improvement comprising:
a pair of pads each having a felt surface positioned on opposite sides of said path between the head and the supply reel, and
means controled by the movement of said member for effecting driving engagement between the capstan and pressure roller and for biasing one of said pads transversely of said path toward the other to press the tape between said surfaces and thereby afford uniform back tension in the tape as it is drawn across the head by the driving engagement of the pressure roller and capstan.

5. Tape transport mechanism including
means for rotatably mounting a supply reel on which is wound a tape having a stiff, flexible outer end portion of greater width than the major portion of the tape,
means for mounting and rotatably driving a take-up reel to wind said tape thereon,
means for rotatably driving said supply reel to rewind said tape,
means defining a predetermined path along which the tape is moved in rewinding, said tape transport mechanism having in combination:
a pair of rewind sensing members having opposed surfaces,
means for biasing at least one of said opposed surfaces toward the other to define a boundary between the surfaces of less thickness than that of said outer end portion,
means locating said opposed surfaces in a first position wherein said boundary between the opposed surfaces registers with said predetermined path on rewind but lies entirely beyond the width of the major portion of the tape and within the width of said outer end portion, and
means permitting said rewind sensing members to move as a unit along said predetermined path to a second position upon frictional engagement with said outer end portion to indicate that the major portion of the tape has been rewound.

6. Tape transport mechanism including
means for rotatably mounting a supply reel on which is wound a tape having attached to its outer end a stiff, flexible, normally straight leader having a portion of greater width than the tape,
means for mounting and rotatably driving a take-up reel to wind said tape thereon,
means for rotatably driving said supply reel to rewind said tape,
guide means defining a predetermined path along which the tape and leader are moved in rewinding,
said guide means including members spaced apart a distance greater than the width of the tape and less than the width of said wide leader portion and adapted to retain said wide leader portion in said predetermined path, said transport mechanism having in combination:
a pair of rewind sensing members having opposed surfaces,
means biasing said opposed surfaces into contact during the rewinding,
means locating said opposed surfaces in a first position near said supply reel wherein the boundary between the opposed surfaces registers with said predetermined path on rewind but lies entirely beyond the width of the tape and within the width of said wide leader portion,
means permitting said rewind sensing members to move as a unit along said predetermined path to a second position upon frictional engagement with said wide leader portion,
an additional sensing member positioned adjacent said path during rewinding of the tape,
means controlled by the movement of said first mentioned sensing members to said second position for biasing said additional sensing member transversely of said path and into contact with said leader,
said biasing means being of insufficient strength to move the wide leader portion beyond said guide means so that the leader remains substantially within said predetermined path and being of sufficient strength to move said additional sensing member transversely across said path when the leader passes, and
means actuated by said movement of the additional sensing member for disabling the rewind means.

7. For use with a supply reel wound with a limp tape having a relatively stiff leader attached to the outer end of the tape,
tape transport mechanism including
means for mounting a said supply reel for rotation,
means for mounting and rotatably driving a take-up reel,
means for feeding a said leader from the supply reel along a predetermined path to said take-up reel and for effecting wind-up engagement of the leader on the take-up reel,
a capstan and cooperating pressure roller positioned on opposite sides of said predetermined path, said transport mechanism having in combination:
a sensing member,
means holding said sensing member on one side of said predetermined path prior to transport of a said stiff leader from the supply reel,
biasing means for urging said sensing member transversely across said predetermined path,
said biasing means being of insufficient strength to move the relatively stiff leader substantially out of said predetermined path and being of sufficient strength to move the limp tape to an alternate path,
means responsive to a timed cycle after actuation of said leader feeding means for disengaging said leader feeding means and for releasing said holding means to permit said sensing member to be urged by said biasing means transversely with respect to said predetermined path, and means operative by the movement of said sensing member to said alternate path after passage of said leader for initiating a succeeding function.

References Cited by the Examiner

UNITED STATES PATENTS

| | | | |
|---|---|---|---|
| 2,873,926 | 2/1959 | Roberts | 242—55.12 |
| 2,891,736 | 6/1959 | Blaes | 242—55.12 |
| 3,044,725 | 7/1962 | Gams et al. | 242—55.12 |
| 3,058,683 | 10/1962 | Wahlstrom | 242—55.11 |
| 3,100,090 | 8/1963 | Goodell et al. | 242—55.13 |
| 3,105,645 | 10/1963 | Rost | 242—55.13 |
| 3,208,682 | 9/1965 | Pastor et al. | 242—55.12 |

FRANK J. COHEN, *Primary Examiner.*

MERVIN STEIN, *Examiner.*

G. F. MAUTZ, *Assistant Examiner.*